US008437514B2

(12) United States Patent
Wen et al.

(10) Patent No.: US 8,437,514 B2
(45) Date of Patent: May 7, 2013

(54) CARTOON FACE GENERATION

(75) Inventors: Fang Wen, Beijing (CN); Lin Liang, Beijing (CN); Ying-Qing Xu, Beijing (CN); Xin Zou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1319 days.

(21) Appl. No.: 11/865,833

(22) Filed: Oct. 2, 2007

(65) Prior Publication Data
US 2009/0087035 A1    Apr. 2, 2009

(51) Int. Cl.
*G06K 9/00*    (2006.01)

(52) U.S. Cl.
USPC .......................... 382/118; 382/165; 382/225

(58) Field of Classification Search .................. 382/118, 382/225, 165; 345/473
See application file for complete search history.

(56) References Cited

U.S. PATENT DOCUMENTS

| | | | |
|---|---|---|---|
| 4,823,285 A | 4/1989 | Blancato | |
| 5,995,119 A | 11/1999 | Cosatto et al. | |
| 6,028,960 A * | 2/2000 | Graf et al. | 382/203 |
| 6,061,462 A | 5/2000 | Tostevin et al. | |
| 6,061,532 A | 5/2000 | Bell | |
| 6,075,905 A | 6/2000 | Herman et al. | |
| 6,128,397 A | 10/2000 | Baluja et al. | |
| 6,226,015 B1 | 5/2001 | Danneels et al. | |
| 6,463,205 B1 | 10/2002 | Aschbrenner et al. | |
| 6,556,196 B1 | 4/2003 | Blanz et al. | |
| 6,677,967 B2 | 1/2004 | Sawano et al. | |
| 6,690,822 B1 * | 2/2004 | Chen et al. | 382/162 |
| 6,707,933 B1 | 3/2004 | Mariani et al. | |
| 6,792,707 B1 | 9/2004 | Setteducati | |
| 6,894,686 B2 | 5/2005 | Stamper et al. | |
| 6,937,745 B2 * | 8/2005 | Toyama | 382/103 |
| 7,039,216 B2 * | 5/2006 | Shum et al. | 382/100 |
| 7,092,554 B2 * | 8/2006 | Chen et al. | 382/118 |
| 7,167,179 B2 | 1/2007 | Nozawa | |
| 7,859,551 B2 | 12/2010 | Bulman et al. | |
| 7,889,551 B2 | 2/2011 | Yang et al. | |
| 2002/0012454 A1 * | 1/2002 | Liu et al. | 382/118 |
| 2003/0016846 A1 * | 1/2003 | Chen et al. | 382/117 |
| 2003/0069732 A1 | 4/2003 | Stephany et al. | |
| 2004/0075866 A1 | 4/2004 | Thormodsen et al. | |
| 2005/0013479 A1 | 1/2005 | Xiao et al. | |

(Continued)

FOREIGN PATENT DOCUMENTS

| | | |
|---|---|---|
| WO | W09602898 A1 | 2/1996 |
| WO | WO0159709 A1 | 8/2001 |

OTHER PUBLICATIONS

Chen et al, "PicToon: A Personalized Image-based Cartoon System", 2002, Proceedings of ACM Multimedia, pp. 171-178.*

(Continued)

*Primary Examiner* — John Strege
(74) *Attorney, Agent, or Firm* — Lee & Hayes, PLLC

(57) ABSTRACT

A face cartooning system is described. In one implementation, the system generates an attractive cartoon face or graphic of a user's facial image. The system extracts facial features separately and applies pixel-based techniques customized to each facial feature. The style of cartoon face achieved resembles the likeness of the user more than cartoons generated by conventional vector-based cartooning techniques. The cartoon faces thus achieved provide an attractive facial appearance and thus have wide applicability in art, gaming, and messaging applications in which a pleasing degree of realism is desirable without exaggerated comedy or caricature.

20 Claims, 6 Drawing Sheets

U.S. PATENT DOCUMENTS

| | | | |
|---|---|---|---|
| 2005/0100243 A1* | 5/2005 | Shum et al. ............... | 382/276 |
| 2005/0129288 A1 | 6/2005 | Chen et al. | |
| 2005/0135660 A1* | 6/2005 | Liu et al. ............... | 382/118 |
| 2005/0212821 A1* | 9/2005 | Xu et al. ............... | 345/647 |
| 2006/0062435 A1 | 3/2006 | Yonaha | |
| 2006/0082579 A1* | 4/2006 | Yao ............... | 345/473 |
| 2006/0092154 A1 | 5/2006 | Lee | |
| 2006/0115185 A1* | 6/2006 | Iida et al. ............... | 382/305 |
| 2006/0203096 A1* | 9/2006 | LaSalle et al. ............... | 348/208.14 |
| 2006/0204054 A1 | 9/2006 | Steinberg et al. | |
| 2007/0009028 A1* | 1/2007 | Lee et al. ............... | 375/240.08 |
| 2007/0031033 A1 | 2/2007 | Oh et al. | |
| 2007/0091178 A1* | 4/2007 | Cotter et al. ............... | 348/159 |
| 2007/0171228 A1* | 7/2007 | Anderson et al. ............... | 345/473 |
| 2007/0237421 A1 | 10/2007 | Luo et al. | |
| 2008/0089561 A1 | 4/2008 | Zhang | |
| 2008/0158230 A1* | 7/2008 | Sharma et al. ............... | 345/473 |
| 2008/0187184 A1 | 8/2008 | Yen | |
| 2009/0252435 A1* | 10/2009 | Wen et al. ............... | 382/284 |

OTHER PUBLICATIONS

Chen, et al., "PicToon: A Personalized Image-based Cartoon System", available at least as early as Jun. 13, 2007, at <<http://delivery.acm.org/10.1145/650000/641040/p171-chen.pdf? key 1=641040& key2=1795371811&coll=GUIDE&dl=GUIDE&CFID=21270 614& CFTOKEN=18921023>>, ACM, 2002, pp. 171-178.

Chiang, et al., "Automatic Caricature Generation by Analyzing Facial Features", available at least as early as Jun. 13, 2007 at <<http://imlab.cs.nccu.edu.tw/paper/dfgaccv2004.pdf, Asia Conference on Comupter Vision, 2004, pp. 6.

Ruttkay, et al., "Animated CharToon Faces", available at least as early as Jun. 13, 2007, at <<http://kucg.korea.ac.kr/Seminar/2003/src/PA-03-33.pdf>>, pp. 12.

"Cartoon Maker v4.71", Liangzhu Software, retrieved Nov. 5, 2007, at <<http://www.liangzhuchina.com/cartoon/index.htm>>, 3 pgs.

Chen et al., "Face Annotation for Family Photo Album Management", Intl Journal of Image and Graphics, 2003, vol. 3, No. 1, 14 pgs.

Cui et al., "EasyAlbum: An Interactive Photo Annotation System Based on Face Clustering and Re-Ranking", SIGCHI 2007, Apr./May 2007, 10 pgs.

Gu et al., "3D Alignment of Face in a Single Image", IEEE Intl Conf on Computer Vision and Pattern Recognition, Jun. 2006, 8 pgs.

Hays et al., "Scene Completion Using Millions of Photographs", ACM Transactions on Graphics, SIGGRAPH, Aug. 2007, vol. 26, No. 3, 7 pgs.

"IntoCartoon Pro 3.0", retrieved Nov 5, 2007 at <<http://www.intocartoon.com/>>, Intocartoon.com, Nov. 1, 2007, 2 pgs.

Jia et al., "Drag-and-Drop Pasting", SIGGRAPH 2006, Jul. 30-Aug. 30, 2006, 6 pgs.

Perez et al., "Poisson Image Editing", ACM Transactions on Graphics, Jul. 2003, vol. 22, Issue 3, Proc ACM SIGGRAPH, 6 pgs.

"Photo to Cartoon", retrieved on Nov. 5, 2007 at <<http://www.caricature-software.com/products/photo-to-cartoon.html>>, Caricature Software, Inc., 2007, 1 pg.

Reinhard et al., "Color Transfer Between Images", IEEE Computer Graphics and Applications, Sep./Oct. 2001, vol. 21, No. 5, 8 pgs.

Suh et al., "Semi-Automatic Image Annotation Using Event and Torso Identification", Tech Report HCIL 2004-15, 2004, Computer Science Dept, Univ of Maryland, 4 pgs.

Tian et al., "A Face Annotation Framework with Partial Clustering and Interactive Labeling", IEEE Conf on Computer Vision and Pattern Recognition, Jun. 2007, 8 pgs.

Viola et al., "Robust Real-Time Face Detection", Intl Journal of Computer Vision, May 2004, vol. 57, Issue 2, 18 pgs.

Wang et al, "A Unified Framework for Subspace Face Recognition", IEEE Transactions on Pattern Analysis and Machine Intelligence, Sep. 2004, vol. 26, Issue 9, 7 pgs.

Wang et al., "Random Sampling for Subspace Face Recognition", Intl Journal of Computer Vison, vol. 70, No. 1, Jan. 2006, 14 pgs.

Xiao et al., "Robust Multipose Face Detection in Images", IEEE Transactions on Circuits and Systems for Video Technology, Jan. 2004, vol. 14, Issue 1, 11 pgs.

Zhang et al., "Automated Annotation of Human Faces in Family Albums", Proc ACM Multimedia, Nov. 2003, 4 pgs.

Zhang et al., "Efficient Propagation for Face Annotation in Family Albums", Pro ACM Multimedia, Oct. 2004, 8 pgs.

Zhao et al., "Automatic Person Annotation of Family Photo Album", CIVR 2006, Jul. 2006, pp. 163-172.

Zhao et al., "Face Recognition: A Literature Survey", ACM Computing Surveys, Dec. 2003, vol. 35, Issue 4, pp. 399-459.

Zhou et al., "Bayesian Tangent Shape Model: Estimating Shape and Pose Parameters via Bayesian Inference", Computer Vision and Pattern Recognition, 2003 IEEE, Jun. 2003, 8 pgs.

Agarwala et al., "Interactive Digital Photomontage", ACM Transactions on Graphics (TOG)—Proceedings of ACM SIGGRAPH 2004, Mar. 23, 2004, pp. 294-302.

Non-Final Office Action for U.S. Appl. No. 12/200,361, mailed on Sep. 27, 2011, Fang Wen, "Cartoon Personalization", 22 pages.

Office Action for U.S. Appl. No. 12/200,361, mailed on Feb. 7, 2012, Fang Wen, "Cartoon Personalization", 32 pgs.

Douglas, Mark, "Combining Images in Photoshop" Department of Fine Arts at Fontbonne University, Aug. 19, 2005, Web 31, retrieved on Jan. 2012 from <<http://fineats.fontbonne.edu/tech/dig_img/bitmap/bm_ci.html, 3 pages.

Office action for U.S. Appl. No. 12/200,361, mailed on Oct. 15, 2012, Wen et al., "Cartoon Personalization", 38 pages.

Office action for U.S. Appl. No. 12/200,361, mailed on Mar. 7, 2013, Wen et al., "Cartoon Personalization ", 38 pages.

* cited by examiner

CARTOON FACE GENERATION

BACKGROUND

With the proliferation of gaming, personal website, instant messaging, and virtual reality scenarios, more and more users wish to enter websites and virtual worlds as artistically modified versions of themselves. However, conventional vector-based cartoon generators for making a caricature, gaming figure, or avatar of oneself can end up providing poorly executed or amateurish-appearing results, or may lose various facial qualities that make the user recognizable as a unique individual. Often the conventional techniques provide too much exaggerated caricature. What is needed is a system that maintains or improves the attractive integrity and recognizable qualities of a human face while converting an image of the user's face to a cartoon style.

SUMMARY

A face cartooning system is described. In one implementation, the system generates an attractive cartoon face or graphic of a user's facial image. The system extracts facial features separately and applies pixel-based techniques customized to each facial feature. The style of cartoon face achieved resembles the likeness of the user more than cartoons generated by conventional vector-based cartooning techniques. The cartoon faces thus achieved provide an attractive facial appearance and thus have wide applicability in art, gaming, and messaging applications in which a pleasing degree of realism is desirable without exaggerated comedy or caricature.

This summary is provided to introduce exemplary cartoon face generation, which is further described below in the Detailed Description. This summary is not intended to identify essential features of the claimed subject matter, nor is it intended for use in determining the scope of the claimed subject matter.

DETAILED DESCRIPTION

Overview

Described herein are systems and methods for cartoon face generation. In one implementation, an exemplary system generates a cartoon face from an original image, such as a photo that portrays a user's face. The style of cartoon face resembles the likeness of the person portrayed in the original photo more than cartoons generated by conventional vector-based cartooning techniques. The cartoon faces thus achieved render an attractive facial appearance and thus have wide applicability in art, gaming, and messaging applications in which a cartoon, avatar, or action figure is desired that captures the user's appearance with a pleasing degree of realism but without exaggerated comedy or caricature. For example, a user can insert a cartoon or graphic of the user's own face into a game or an instant messaging forum. The exemplary system achieves pleasing cartoon faces by applying pixel-based methods separately to some parts of the cartooning process.

Exemplary System

Figure 1:
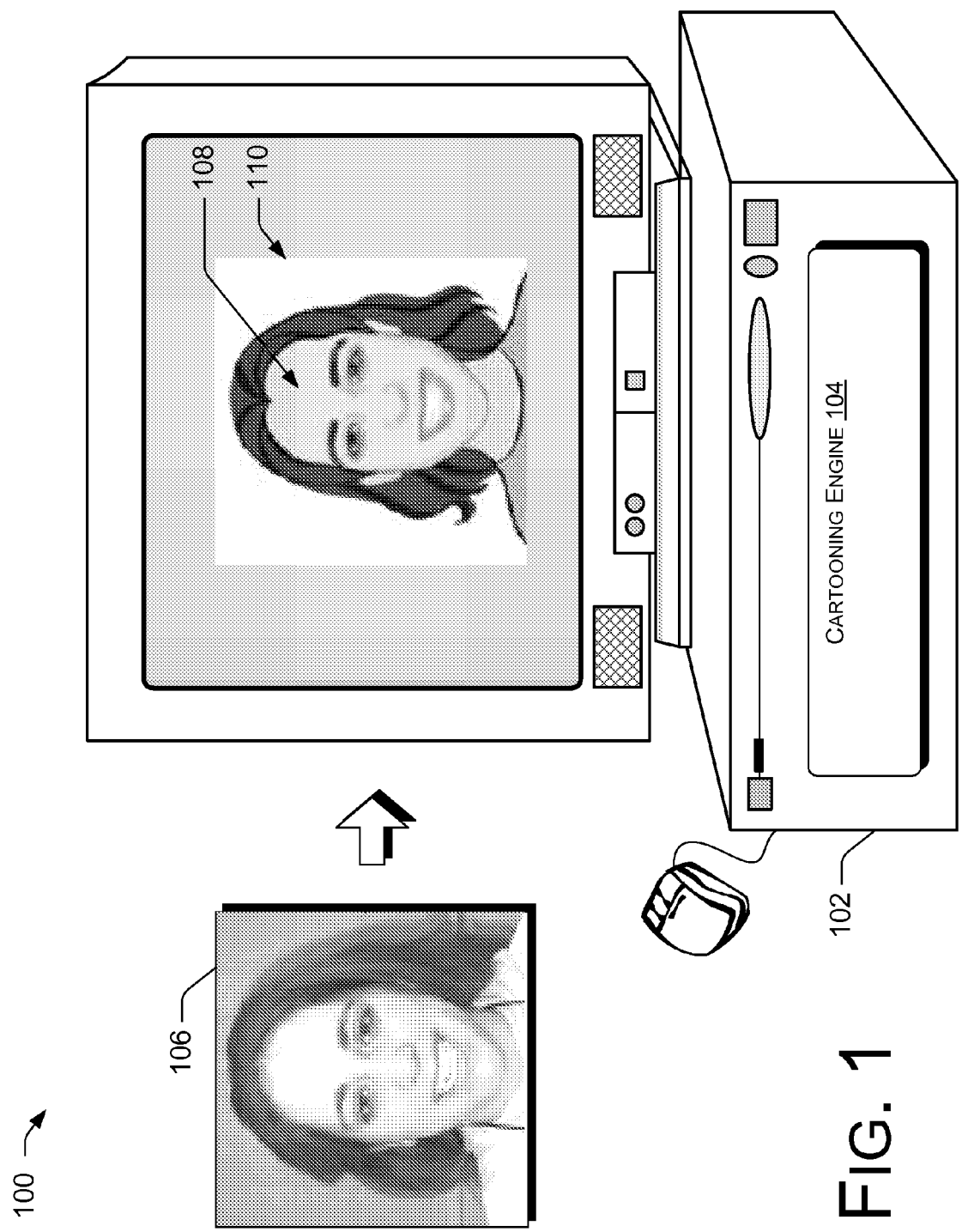
FIG. 1 is a diagram of an exemplary system for generating cartoon faces.

FIG. 1 shows an exemplary face cartooning system 100. A computing device 102, such as a computer or other device that includes processor, memory, and data storage, etc., hosts an exemplary cartooning engine 104. A user inputs an original image 106 that includes a portrayal of a face, for example, the user's own face. The cartooning engine 104 performs face detection and alignment on the original image 106, and extracts the visual face from the remainder of the image 106. The cartooning engine 104 then decomposes the face into different parts with alpha-matte masks. For example, the face can be separated into facial skin region(s), shadow region(s), brows, eyes, lips, and an inner-mouth region (if the portrayed mouth is open in the image 106). In one implementation, the cartooning engine 104 adopts different exemplary cartooning techniques for the different face parts extracted from the facial image or, alternatively, applies the same approach to multiple of the extracted parts but with different parameters for each part. Then, the cartooning engine 104 re-composes the separate parts via matte-compositing techniques to generate a finished, basic cartoon face 108. Finally, other accessories, such as neck, hair, hat, eyeglasses, beard, etc., are added, e.g., as templates pre-drawn by artists, to form the finished cartoon 110. The user can change and rearrange the accessory templates for entertaining results.

Exemplary Engine

Figure 2:
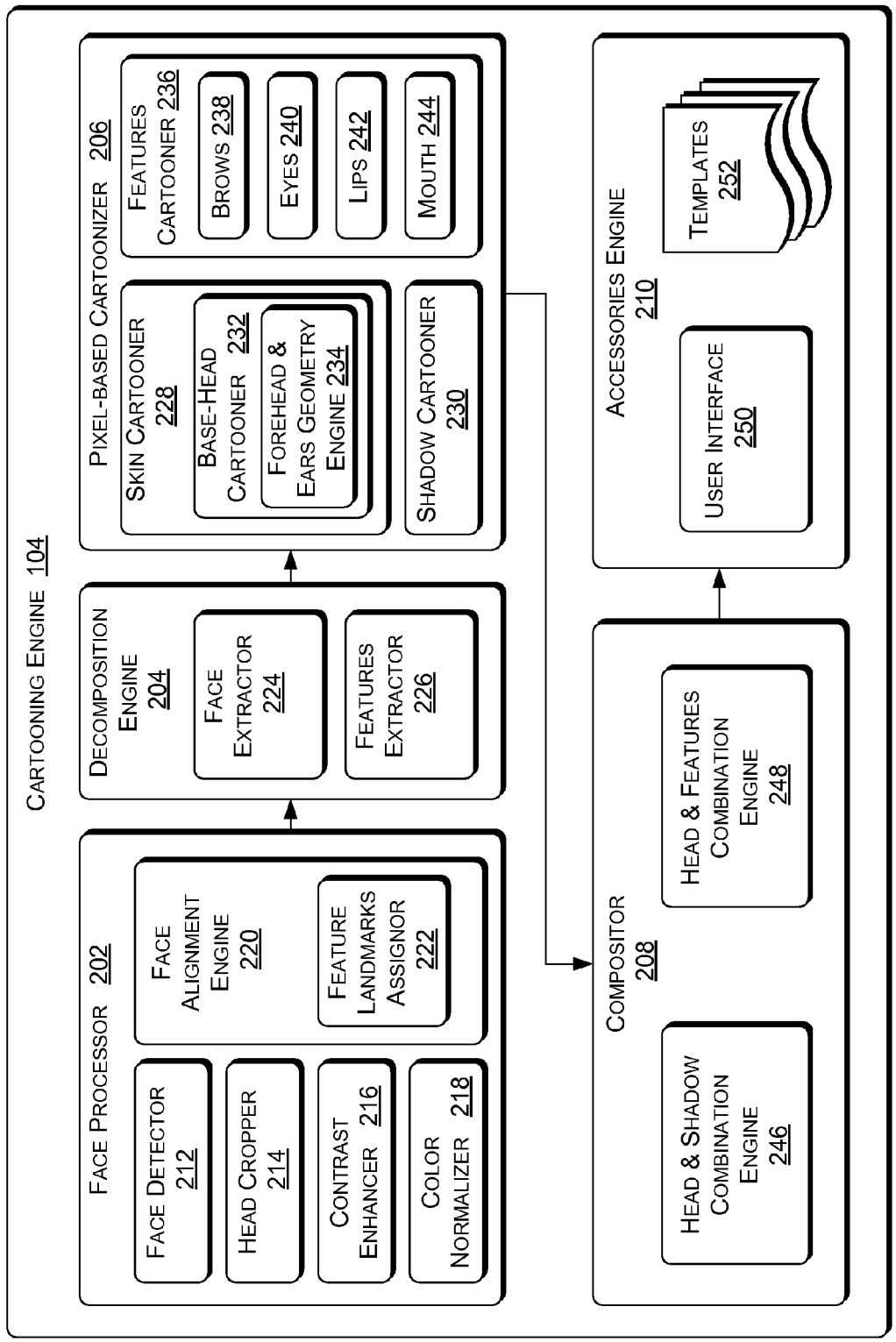
FIG. 2 is a block diagram of an exemplary cartooning engine.

FIG. 2 shows the exemplary cartooning engine 104 of FIG. 1, in greater detail. The illustrated implementation in FIG. 2 is only one example configuration, for descriptive purposes. Many other arrangements of the illustrated components or even different components constituting an exemplary cartooning engine 104 are possible within the scope of the subject matter. Such an exemplary cartooning engine 104 can be executed in hardware, software, or combinations of hardware, software, firmware, etc.

The illustrated example cartooning engine 104 includes a face processor 202, a decomposition engine 204, a pixel-based cartoonizer 206, a compositor 208, and an accessories engine 210.

In one implementation, the face processor 202 further includes a face detector 212, a head cropper 214, a contrast enhancer 216, a color normalizer 218, and a face alignment engine 220, which in turn further includes a feature landmarks assignor 222. Feature landmarks are also known as "feature points" in the description below.

The decomposition engine 204 includes a face extractor 224 and a features extractor 226. How the face and features are extracted will be described in greater detail below.

The terms "cartoonizer" and "cartooner" are used herein to mean cartoon-generating engines or cartoon-assisting processes. The pixel-based cartoonizer 206 further includes a skin cartooner 228, a shadow cartooner 230, and a base-head cartooner 232 associated with the skin cartooner 228, that includes a "forehead & ears" geometry engine 234. Further, the cartoonizer 206 includes a features cartooner 236 including a brows processor 238, eyes processor 240, lips processor 242, and inner-mouth processor 244.

The compositor 208, for re-composing the cartoonized facial parts back into a basic cartoon face 208, includes a "head & shadow" combination engine 246 and a "head & features" combination engine 248.

The accessories engine 210 includes a user interface 250 for selecting and rearranging the templates 252, i.e., templates for selecting and adding the accessories introduced above to the basic face 108.

Operation of the Exemplary Engine

Inspired by the skill and technique applied by artists when drawing cartoons, the exemplary cartooning engine 104 separately processes different parts of the face in the original image 106 using operations well-suited to each part, then composes these parts into a basic cartoon face 108 with matte-compositing techniques. As mentioned above, the accessories engine 210 then adds accessories associated with a face, such as neck, hair, eyeglasses, hat, etc., via templates 252 that can be synthesized by a computing device or pre-drawn by artists.

Figure 3:
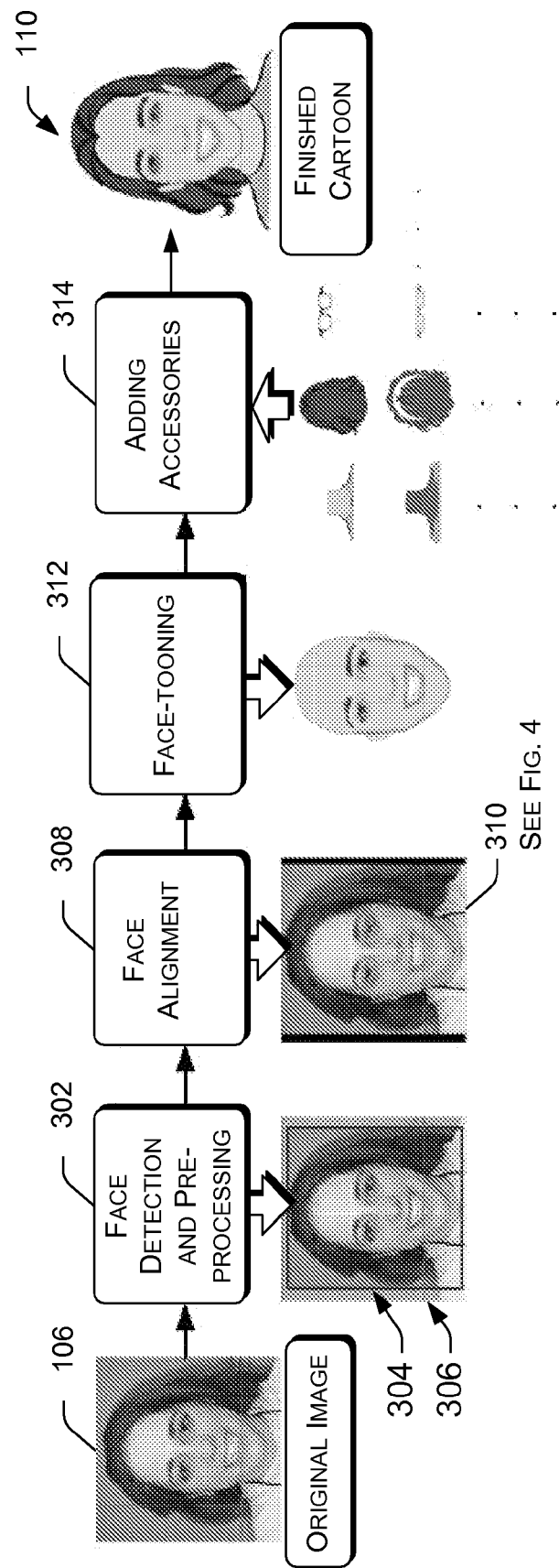
FIG. 3 is a diagram of an exemplary cartooning process.

As shown in FIG. 3, the exemplary cartooning engine 104 implements facial cartooning, which can be describe in four stages:

1) Face Detection and Image Pre-Processing

In the stage of face detection and image pre-processing 302, there are many face detection techniques and alternatives that can be used to detect and locate a face in the original image 106. For example, the face detector 212 may use conventional face detection techniques, or alternatively may use a simple user interaction, such as dragging a rectangle with a computer mouse to frame or designate the subject face in the original image 106.

During pre-processing, the head cropper 214 delimits the portrayed head 304 (including associated hair, etc.) from the background 306, so that the delimited visual head region can become the object of following processing steps.

Since the original image 106 may be a digital photo captured in various lighting conditions, the contrast enhancer 216 may use an auto-leveling technique to enhance the contrast within the visual head region. The color normalizer 218 can then normalize the color histogram if the color is outside of tolerances.

2) Interactive Face Alignment

Figure 4:
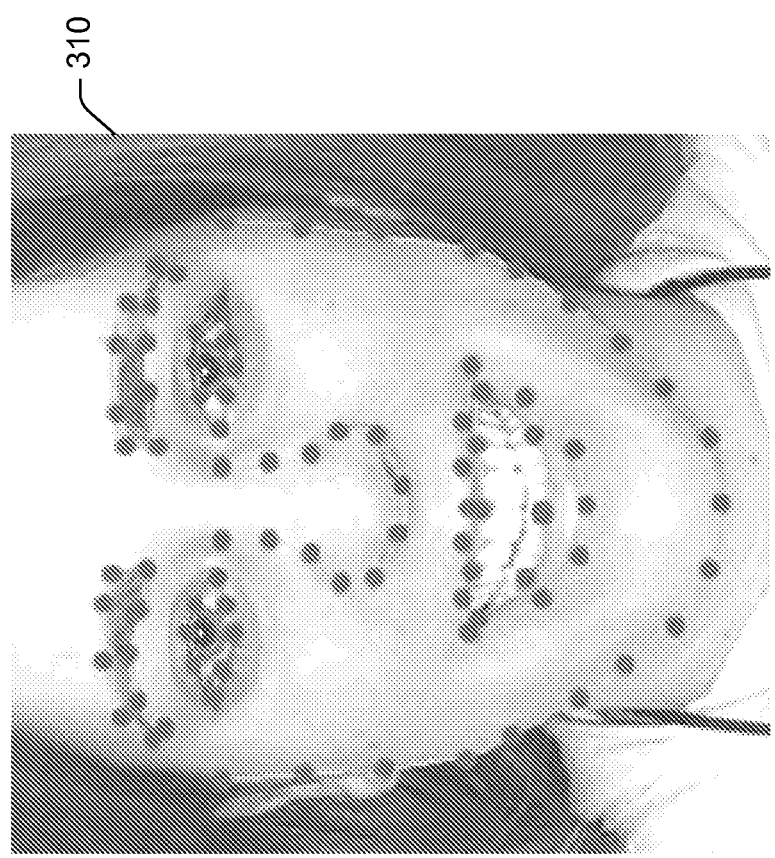
FIG. 4 is a diagram of exemplary face alignment.

The face alignment engine 220 executes face alignment 308 to locate feature landmarks along the contour of different portrayed facial parts: eyes, brows, nose, lips, cheeks, etc. In one implementation, the contours of the landmarked features are approximated with features points—i.e., dots—as shown in FIG. 4. For example, the positions of a total of 87 feature points are shown in FIG. 4, and in one implementation this is a sufficient number for the feature landmarks assignor 222 to capture the differences in features between human individuals, so that individuals can be recognized as unique in the resulting cartoon 110.

Face alignment 308 is an important underpinning for the cartooning engine 104, since the original image 106 is being separated into different facial parts according to the face alignment results 310. That is, the more accurate the face alignment 308, the more accurately the generated-cartoon 110 will imitate the original image 106. In one implementation, the face alignment engine 220 employs or comprises a Bayesian Tangent Shape Model (BSTM), e.g., that uses a constrained BSTM technique. The BSTM-based face alignment engine 220 is robust and accurate enough to obtain facial alignment results automatically. In one implementation, an ordinary BTSM method is used first to gain an initial alignment result. Then the user can modify positions of some feature points by dragging them to the expected positions. These constraints are added in the BTSM searching strategy to obtain an optimal solution.

Once the face alignment 308 is complete, the face can be separated into different parts using the aligned feature points.

3) Face-Tooning

Figure 5:
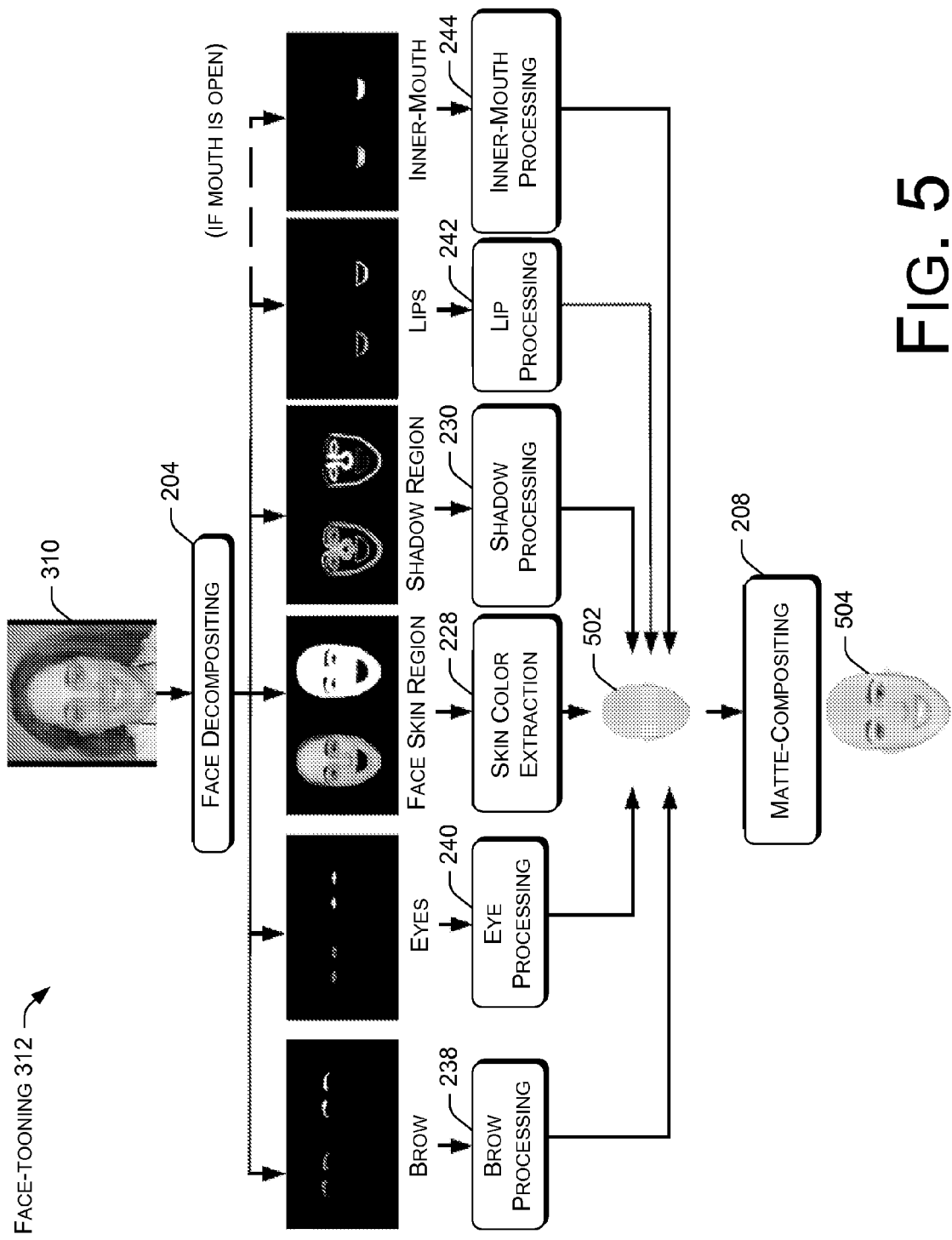
FIG. 5 is a diagram of an exemplary face-tooning process.

Face-tooning 312 is a key phase in personalizing the cartoon face generation. FIG. 5 illustrates an implementation of the process.

First, assisted by the face alignment result shown in FIG. 4, the face extractor 224 separates the face from the original image 106. The features extractor 226 decomposes the extracted face into multiple parts with corresponding alpha matte masks: that is, brows, eyes, facial skin region, facial shadow region, lips, and the inner mouth, when visible. It should be noted that if the mouth is close, the inner-mouth region does not exist, in which case the lips and inner-mouth region can be combined into just a mouth region.

Second, the features cartoonizer 236 adopts different techniques for each extracted facial part, or, adopts the same technique but with different parameters.

Facial Skin and Base-Head Shape

The skin cartooner 228 aims to produce a base-head 502 of the cartoon face, as shown in FIG. 5. There are two processing phases at this stage. The first phase involves extracting skin color from the facial skin region and shifting this extracted skin color to a cartoon style. Actually, the true color of skin is rarely or never extracted because the lighting condition of the original image 106 is unknown. Thus, in one implementation, the skin cartooner 228 clusters pixels of the skin region into five groups according to their lightness. The cluster that has a lightness that is just inferior to the brightest cluster is adopted as representing the true color of the skin. The extracted color is then shifted by adjusting its brightness and chroma attributes into a cartoon style. Often, such solutions are not exact, but do not need to be to draw a base-head 502 of a reasonable cartoon face.

The second phase executed by the skin cartooner 228 in creating a base-head 502 is producing a suitable forehead and ear shape. In one implementation, the forehead and ear shape may be determined from an aligned cheek shape. Thus, in one implementation, the base-head cartooner 232 has a forehead & ears geometry engine 234 that learns an affine transformation from the cheek shape of a reference face to the aligned cheek shape of the aligned original image 106. Then forehead & ears geometry engine 234 applies the same transformation to the forehead and ear shape of the reference face to produce a corresponding forehead and ear shape for the face in the original image 106. Thus, the base-head 502 can be produced along with or after face skin region processing 228.

Shadow Region

The shadow on a face represents 3-dimensional information of the face and becomes an important factor that can influence the likeness between the generated cartoon face 108 and the original image 106. After the shadow cartooner 230 determines the shadow region, the process is straightforward. The shadow cartooner 230 clusters pixels in the shadow region into groups according to their lightness and replaces the color of each pixel with the mean color of the group that the pixel belongs to. The shadow cartooner 230 may also shift the color of the shadow region into a cartoon style, for example, using the same shifting parameters there were used when shifting the facial skin region, because the pixels of the shadow region also belong to the face skin region.

Browse Eyes, Lips, and Inner-Mouth Region

The brows processor 238, eyes processor 240, lips processor 242, and mouth processor 244 take a similar approach for their respective facial regions as that executed for the shadow region, but the number of clusters and shifting parameters may be different for different regions. Additionally, the eyes processor 240 may enlarge the eye regions and their masks to some extent to emphasize the eyes in cartoon face 108, for example, enlarging the eyes 1.1 times, in one implementation. The eyes processor 240 may also enhance contrast of the pixels in the eye regions.

Recombining Facial Parts and Regions

The compositor 208 combines the processed facial parts, e.g., with a matte-compositing technique, in order to obtain the face-tooning result 504. In one implementation, the formulation of matte-compositing is given by Equation (1):

$$I = aF + (1-a)B \qquad (1)$$

where F is image foreground, B is image background, a is the a-matte mask and I is the composed image. Since there are several composition steps, for each step, I represents the composed result, leading to the final result 504.

The head & shadow combination engine 246 combines the base-head image 502 used as background with the shadow region and its corresponding mask, used as foreground. The head & features combination engine 248 then combines the shadowed base-head 502, used as background, one-by-one with the cartoonized brows, eyes, lips and inner-mouth region and their respective masks, these latter parts used as foreground in the combination. Thus, compositor 208 generates the basic cartoon face result 504.

4) Adding Accessories

Referring back to FIG. 3, the step of adding accessories 314 allows the user to select or the computing device to automatically generate or select other parts of the completed cartoon 110, such as neck, hair, accessory artifacts, clothes items, and background. In one implementation, these parts added by templates 252 pre-drawn by artists for fun cartoon effects. In some implementations, the accessories engine 210 may automatically add some accessories by replacing parts of the original image 106 with an accessory or accessory template 252 sized to fit the replaced part. Through the user interface 250, the user can add various accessories such as eyeglasses, hat, beard, hair styles, ribbons, shirt collars.

Exemplary Methods

Figure 6:
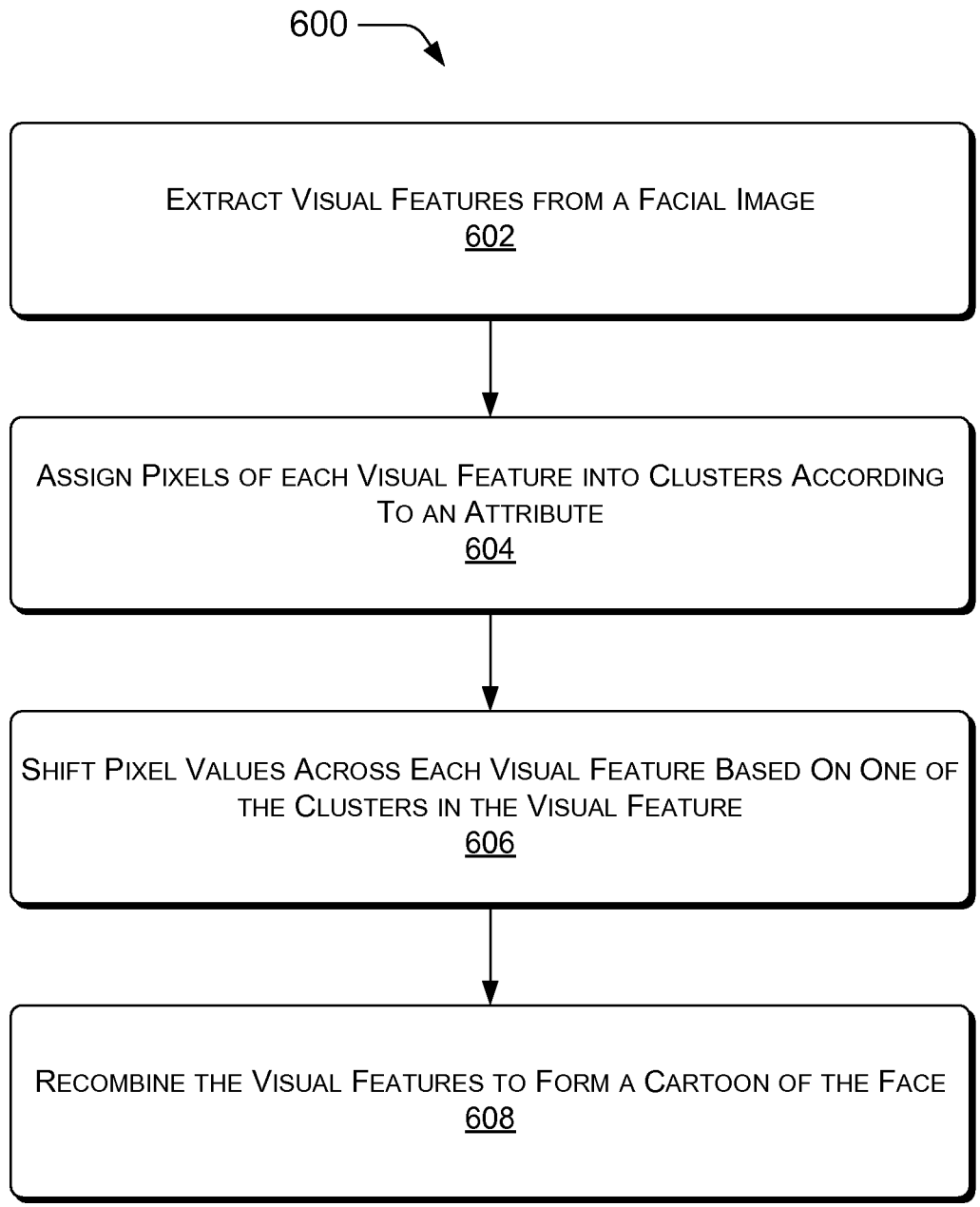
FIG. 6 is a flow diagram of an exemplary method of generating a cartoon face.

FIG. 6 shows an exemplary method 600 of performing exemplary progressive cutout. In the flow diagram, the operations are summarized in individual blocks. The exemplary method 600 may be performed by hardware, software, or combinations of hardware, software, firmware, etc., for example, by components of the exemplary progressive cutout engine 408. At block 602, visual features are extracted from a facial image. At block 604, pixels of each visual feature are assigned into clusters according to an attribute. At block 606, pixels values across each visual feature are shifted based on one of the clusters in the visual feature. At block 608, the visual features are recombined to form a cartoon of the face.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   extracting visual features of a face portrayed in an image, the visual features including a facial shadow that represents three-dimensional information of the face;
   assigning pixels of the facial shadow into clusters according to an attribute;
   for each cluster in the facial shadow, selecting a mean color of a corresponding cluster as a representative color of the corresponding cluster;
   propagating each representative color across all the pixels of the corresponding cluster in the facial shadow; and
   recombining the visual features to form a cartoon of the face.

2. The method as recited in claim 1, further comprising aligning the face for mapping the visual features with points, wherein extracting the visual features includes extracting the visual features and associated alpha-matte masks based on the points.

3. The method as recited in claim 1, wherein the visual features further include at least one of facial skin, eyes, brows, nose, cheeks, lips, and inner mouth.

4. The method as recited in claim 2, wherein the mapping the visual features includes applying a Bayesian Tangent Shape Model (BSTM).

5. The method as recited in claim 1, wherein assigning pixels of the facial shadow into clusters further includes grouping the pixels into the clusters according to a lightness attribute.

6. The method as recited in claim 1, further comprising:
   clustering pixels in an additional visual feature that is a facial skin into additional clusters according to the attribute;
   selecting a color of a second lightest cluster of the additional clusters as a true color of the facial skin.

7. The method as recited in claim 6, further comprising shifting the lightness and chroma of the pixels for the additional visual feature to achieve a cartoon style.

8. The method as recited in claim 1, further comprising learning an affine transformation from a cheek shape of a reference face to a cheek shape of the face in the image to produce a forehead and ear geometry for the face in the image based on a forehead and ear geometry of the reference face.

9. The method as recited in claim 1, further comprising adopting a different cartooning technique for each different visual feature of the face.

10. The method as recited in claim 1, further comprising adopting a same cartooning technique for each different visual feature of the face, and using different parameters for the cartooning technique for each visual feature.

11. The method as recited in claim 1, further comprising:
    applying a pixel-based cartooning technique to an extracted skin region of the face;
    applying a pixel-based cartooning technique to an extracted head shape feature of the face; and
    combining the skin region of the face and the head shape feature of the face to create a base for recombining the remaining visual features of the face.

12. The method as recited in claim 11, further comprising combining the base with a shadow visual feature of the face to form a second base for recombining the subsequent remaining visual features of the face.

13. The method as recited in claim 1, further comprising combining accessories with the cartoon of the face, wherein the accessories include one of a neck, hair, hat, eyeglasses, facial hair, and clothing.

14. A system, comprising:
    a computing device having a cartooning engine, the cartooning engine comprising:
    a decomposition engine that extracts visual features from a face portrayed in an image;
    a cartoonizer that assigns pixels of the visual feature into clusters according to an attribute, and for each cluster, selects a mean color of a corresponding cluster as a representative color of the corresponding cluster, propagates each representative color across all the pixels of the corresponding cluster, and shifts pixel color of the visual feature;

a geometry engine that learns an affine transformation from a cheek shape of a reference face to a cheek shape of the face in the image to obtain a forehead and ear geometry for a base-head background according to a forehead and ear geometry of the reference face; and a compositor that recombines the visual features onto the base-head using an alpha-matte technique to form a cartoon of the face.

15. The system as recited in claim 14, wherein the cartooning engine further comprises a face processor, including a face detector, pre-processing components to enhance contrast and normalize color, and an alignment engine to align the face in the image for mapping facial features.

16. The system as recited in claim 15, wherein the cartooning engine further comprises a user interface for a user to interactively assist mapping the facial features.

17. The system as recited in claim 14, wherein the cartoonizer renders each of the visual features separately into a cartoon style, and wherein the visual features include a skin feature, a shadow feature, a facial geometry feature, an eyebrows features, an eyes feature, a lips feature, and an inner-mouth feature.

18. The system as recited in claim 14, wherein the cartooning engine further comprises an accessories engine that adds user-selected pre-drawn visual features to the cartoon of the face.

19. A system, comprising:
a computing device having a cartooning engine, the cartooning engine comprising:
   a decomposition engine that extracts visual features from a face portrayed in an image;
   a cartoonizer including a cartooner component that assigns pixels of a visual feature into at least five clusters according to a lightness attribute, selects a color from a second lightest cluster of the at least five clusters as a representative color for all the pixels in the visual feature, propagates the representative color across all the pixels of the visual feature, and shifts pixel color of the visual feature; and
   a compositor that recombines the visual features using an alpha-matte technique to form a cartoon of the face.

20. The method as recited in claim 2, further comprising receiving user input of an adjustment to at least one point of the points, wherein extracting the visual features includes extracting the visual features and associated alpha-matte masks based on the points that includes the at least one point that is adjusted.

* * * * *